United States Patent
Naldi

[11] Patent Number: 6,067,884
[45] Date of Patent: *May 30, 2000

[54] PART CUTTING MACHINE

[75] Inventor: Valter Naldi, Bologna, Italy

[73] Assignee: Selco S.r.l., Pesaro, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/730,695

[22] Filed: Oct. 11, 1996

[30] Foreign Application Priority Data

Oct. 11, 1995 [IT] Italy ................ BO95A0483

[51] Int. Cl.$^7$ ..................................... B26D 1/18
[52] U.S. Cl. ..................... 83/455; 83/488; 83/614
[58] Field of Search ............... 83/455, 488, 489, 83/863, 491, 614, 454

[56] References Cited

U.S. PATENT DOCUMENTS

| | | | |
|---|---|---|---|
| 630,019 | 8/1899 | Worthen | 83/455 |
| 1,527,150 | 2/1925 | Leaver, Jr. | 83/491 X |
| 2,846,005 | 8/1958 | Wilson | 83/488 X |
| 3,138,049 | 6/1964 | Flory et al. | 83/488 X |
| 3,213,907 | 10/1965 | Pappas | 83/488 X |
| 3,483,784 | 12/1969 | Kaiser | 83/488 X |
| 3,695,135 | 10/1972 | Jagers | 83/455 |
| 3,820,233 | 6/1974 | Baker | 83/455 X |
| 3,986,419 | 10/1976 | Cleghorn | 83/174 |
| 4,012,992 | 3/1977 | Smrekar et al. | 83/488 X |
| 4,334,450 | 6/1982 | Benuzzi | 83/488 X |
| 4,355,794 | 10/1982 | Costigna | 270/31 |
| 4,383,458 | 5/1983 | Kitai et al. | 83/455 X |
| 4,706,535 | 11/1987 | Ducharme | |
| 4,771,667 | 9/1988 | Forman et al. | 83/489 X |
| 5,001,955 | 3/1991 | Fujiwara | 83/488 |
| 5,044,241 | 9/1991 | Labrecque | 83/489 |
| 5,159,869 | 11/1992 | Tagliaferri | 83/488 X |
| 5,458,034 | 10/1995 | Cavagna | 83/488 |

FOREIGN PATENT DOCUMENTS

| | | |
|---|---|---|
| 0154277 | 9/1985 | European Pat. Off. |
| 0267156 | 5/1988 | European Pat. Off. |
| 2153618 | 6/1973 | Germany |

OTHER PUBLICATIONS

Russian Engineering Journal (Vestnik Mashinostroenia Mashinostroenie), vol. 3, No. 9, Sep. 1983, Melton Mowbray GB, pp. 71–74, XP002022896 Zaichenko: "Optimization of the Structure of Infinite Variable Drives for Machine Tool Spindles", Figs. 1,3.

*Primary Examiner*—Kenneth E. Peterson
*Attorney, Agent, or Firm*—Lowe Hauptman Gopstein Gilman & Berner

[57] ABSTRACT

A machine for cutting parts, wherein a carriage, movable in a given direction, is fitted with at least one rotary tool for cutting the parts parallel to the given direction; an actuating assembly moving the carriage in the given direction to and from an idle position; the carriage supporting a drive assembly presenting a motor and a gear transmission assembly interposed between the motor and the tool; and the transmission assembly rotating the tool at a speed other than that of the motor according to at least one given reduction ratio.

13 Claims, 2 Drawing Sheets

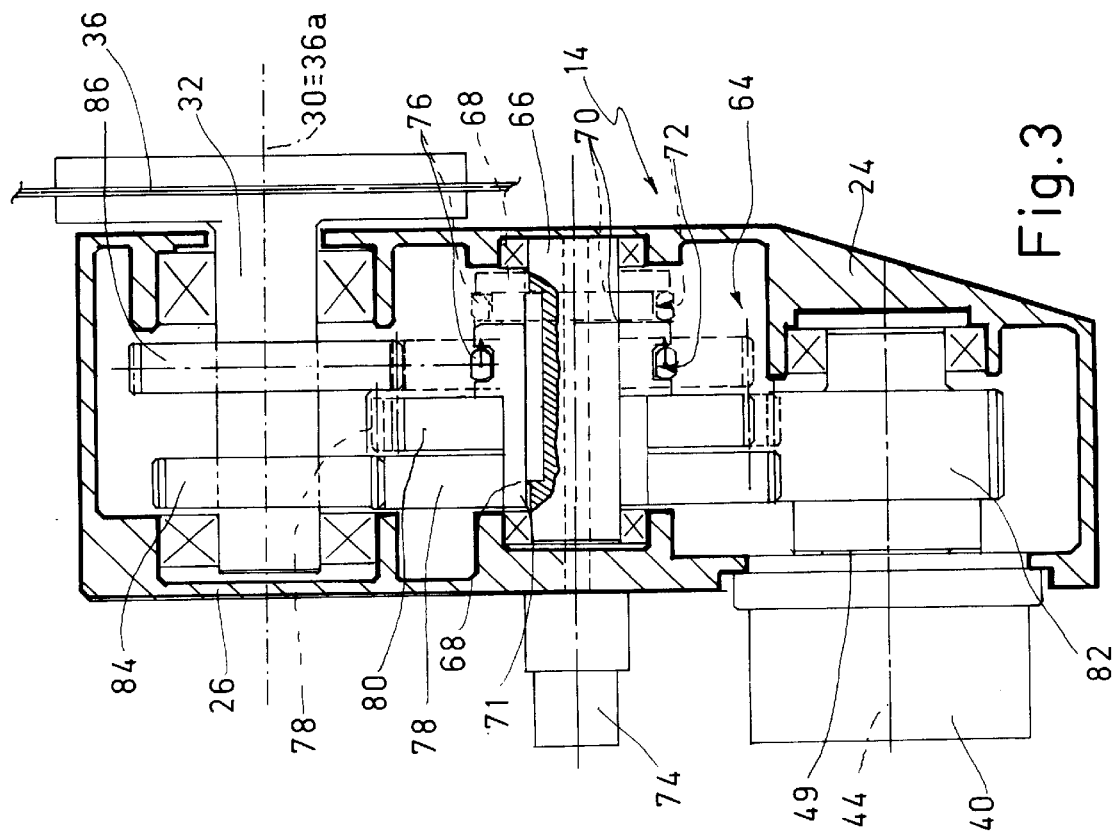
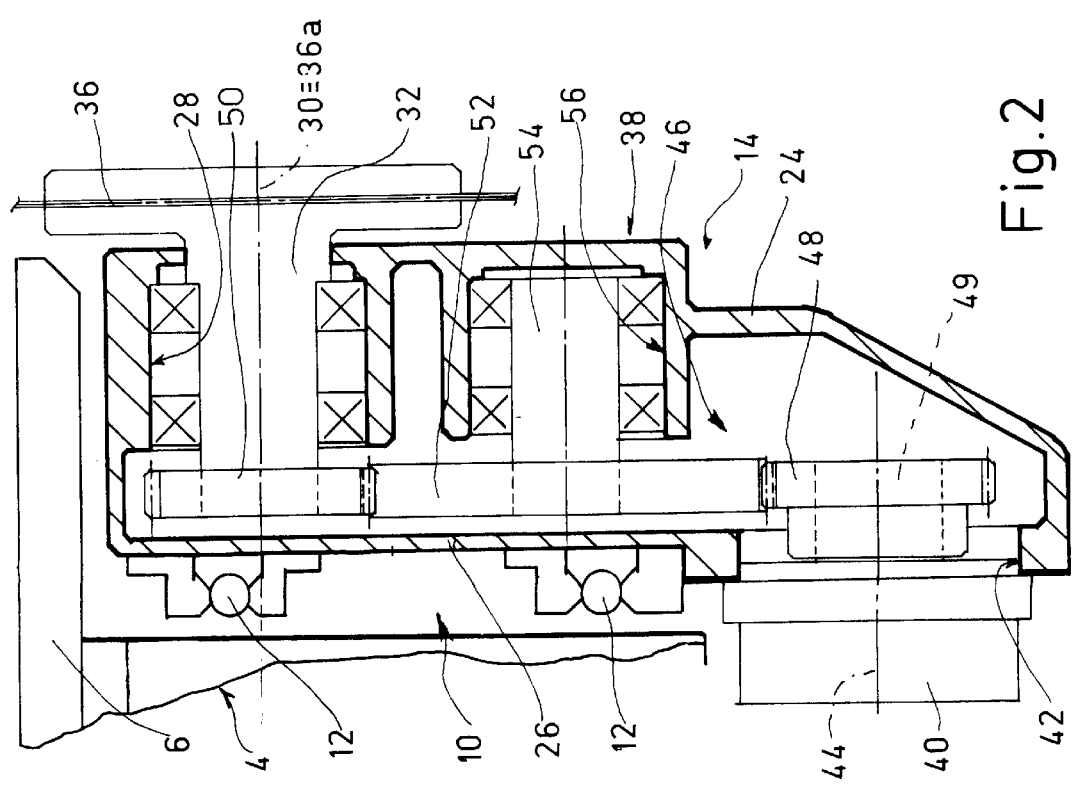

６,067,884

1

PART CUTTING MACHINE

BACKGROUND OF THE INVENTION

The present invention relates to a part cutting machine.

Elongated parts made of material such as wood or the like are cut on machines presenting a base of roughly the same size but no smaller than the parts to be cut; a straight guide extending in a given direction and fitted integrally to one edge of the base; a carriage movable along the guide; and a cutting assembly fitted to the carriage and for cutting the part parallel to said direction.

The cutting assembly normally features a rotary tool, such as a circular saw or the like, which cuts the parts in a vertical plane parallel to said given direction. The tool is operated by a drive, which, to reduce the overall width, is fitted to the carriage to the side of the tool, and comprises an electric motor and a parallel-axis speed reducer, in particular a belt reducer. Though mainly adopted for reasons of troublefree assembly and maintenance, this type of reducer presents several drawbacks when cutting very thick parts, or, to save time, when cutting a number of thin parts of the same shape and placed one on top of the other to define a pack of considerable thickness. In both of which cases, the tool requires a particularly high cutting torque, which means using very wide belts and, hence, greatly increasing the distance between the cutting plane and the edge of the base to which the carriage guide is fitted. As such, the cutting region of the machine is a considerable distance from the edge of the base, so that the material is substantially cut in a projecting manner, which obviously results in vibration of both the machine and the material being cut, in a rapid fall-off in performance of the machine, and in poor quality of the cut parts.

SUMMARY OF THE INVENTION

It is an object of the present invention to provide a part cutting machine designed to overcome the aforementioned drawbacks.

According to the present invention, there is provided a machine for cutting parts, and comprising a frame extending in a given direction; a carriage movable in relation to said frame and in said direction; and pressing means for clamping said parts in position integral with said frame; actuating means being provided to move said carriage, in said direction, to and from an idle position; said carriage supporting at least one rotary member for integrally supporting at least one tool for cutting the parts parallel to said direction; and the carriage also supporting at least one drive device presenting a motor and a transmission assembly for activating a respective said rotary member; characterized in that each said transmission assembly is a gear transmission assembly interposed between said motor and said rotary member.

BRIEF DESCRIPTION OF THE DRAWINGS

A number of non-limiting embodiments of the present invention will be described by way of example with reference to the accompanying drawings, in which:

FIG. 2 shows a larger-scale section along line II—II, and with parts removed for clarity, of a first embodiment of a detail in FIG. 1;

FIG. 3 shows a larger-scale section, with parts removed for clarity, of a second embodiment of the FIG. 2 detail.

2

DETAILED DESCRIPTION OF THE INVENTION

Figure 1:
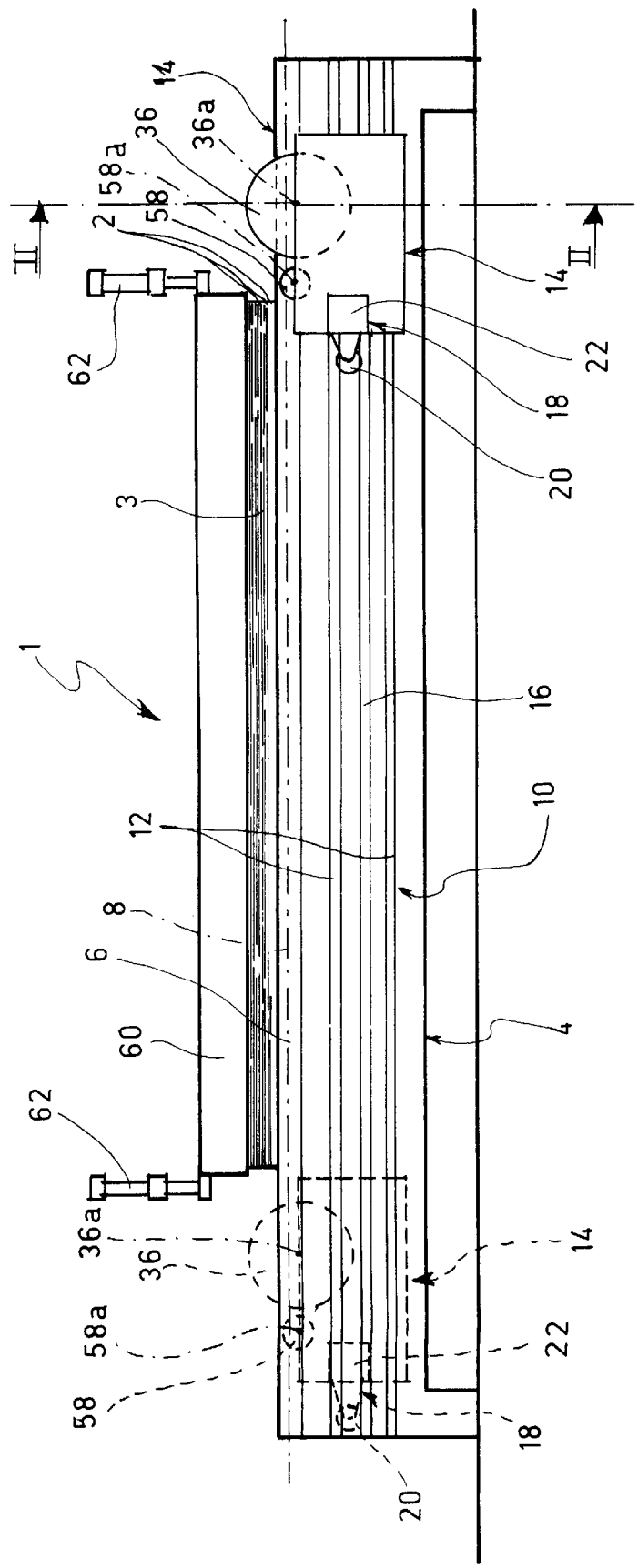
FIG. 1 shows a schematic side view of a machine in accordance with the present invention.

Number 1 in FIG. 1 indicates a machine for cutting parts 2, which, in the example shown, comprise wooden panels, even of considerable length and weight, placed neatly one on top of the other to form packs 3 of considerable thickness.

Machine 1 comprises a frame 4, which presents a substantially horizontal worktable 6 extending (in FIG. 1) in a substantially horizontal direction 8, and is fitted laterally with a straight guide 10 extending in direction 8 and defined by two cylindrical bodies 12 integral with frame 4. Machine 1 also comprises a box carriage 14 fitted in axially-sliding, angularly-fixed manner to cylindrical bodies 12.

Frame 4 also presents a rack 16 located between and parallel to cylindrical bodies 12, and cooperating with an actuating device 18 for moving carriage 14 along guides 10, and of which FIG. 1 only shows schematically a pinion 20 meshing with rack 16, and an electric motor 22 for activating pinion 20. Actuating device 18 provides for moving carriage 14 to and from an idle position (to the right in FIG. 1) to which carriage 14 is set to enable loading and unloading of parts 2 on and off worktable 6.

With reference to FIG. 2, carriage 14 is defined laterally by a front lateral wall 24 and a rear lateral wall 26, both of which are supporting walls, and presents a seat 28 formed at the worktable 6 end and in turn presenting a horizontal axis 30 perpendicular to direction 8. Via the interposition of ball bearings, seat 28 houses in axially-fixed, angularly-free manner a rotary member 32 coaxial with axis 30 and presenting a larger-diameter portion projecting from wall 24 and for coaxially supporting a rotary tool 36, in particular a circular saw, for cutting packs 3. Carriage 14 presents a drive 38, which comprises an electric motor 40 fitted in projecting manner to wall 26 at a cylindrical through seat 42 located beneath member 32 and presenting an axis 44 parallel to axis 30; and a gear transmission assembly 46 for transmitting rotation from motor 40 to tool 36 according to a given gear ratio.

More specifically, assembly 46 comprises a cylindrical gear 48 fitted to the drive shaft 49 of motor 40 and therefore coaxial with axis 44; and a cylindrical gear 50 fitted to member 32 on the opposite side to tool 36 and located along the vertical axis of gear 48. Gears 48 and 50 are connected by a further cylindrical gear 52 fitted to a countershaft 54 parallel to axes 30 and 44 and supported in idle manner inside a seat 56 formed inside carriage 14 at wall 24.

It should be noted that carriage 14 also presents a further tool 58 (shown only in FIG. 1) operated by a drive substantially identical to drive 38 and therefore not shown or described in detail with reference to the accompanying drawings. Tool 58 is substantially identical to tool 36, and both present respective horizontal axes of rotation 58a and 36a perpendicular to direction 8, so as to define a vertical cutting plane parallel to direction 8. More specifically, axis 36a coincides with axis 30; and tool 58, in use, precedes tool 36, provides for notching pack 3 in preparation for the actual cutting operation, and, being a notching tool, presents a smaller radius than tool 36.

Operation of machine 1 will now be described as of the condition in which a pack 3 is positioned on worktable 6 and held in the cutting position integral with frame 4 by a pressing device 60 (FIG. 1) extending parallel to direction 8 and exerting vertical pressure on pack 3 by virtue of two linear actuators 62; and carriage 14 is set to the idle position with tools 58 and 36 rotating and ready to respectively notch and cut pack 3.

When actuating device 18 is operated, carriage 14 is moved to bring tool 58 into contact with pack 3 and notch the pack in preparation for the actual cutting operation by tool 36, is moved by device 18 into a limit stop position in which tool 36 is fully clear of pack 3, and is then restored by device 18 to the idle position.

The gear transmission assemblies employed afford the major advantages of imparting even very high cutting torques to tools 36 and 58, maintaining the cutting plane close to the edge of worktable 6 so that the material projects very little at the cutting region, and therefore reducing the overall width of both carriage 14 and machine 1 itself.

Clearly, changes may be made to machine 1 as described and illustrated herein without, however, departing from the scope of the present invention.

For example, if for any reason tools 36 of different diameters but operating at substantially the same surface speed are required, transmission assembly 46 may be replaced with a gearbox, so that, even using a three-phase asynchronous motor 40, the rotation speed of member 32 may be adapted as required.

FIG. 3 shows a variation of carriage 14, which presents a transmission assembly 64 substantially in the form of a gearbox and which, to simplify the description, supplies power according to only two gear ratios.

For this purpose, countershaft 54 is replaced in assembly 64 by a shaft 66 parallel to member 32 and supported in axially-fixed, angularly-free manner between walls 24 and 26; shaft 66 is fitted coaxially with an angularly-fixed, axially-sliding sleeve 68 presenting, on the tool 36 side, a larger-diameter portion 70 with a circumferential groove 72; and assembly 64 also comprises a linear actuator 74 parallel to member 32, and the free end of the rod of which presents a collar 76. Actuator 74 therefore provides for moving sleeve 68 between a first operating position (shown by the continuous line in FIG. 3) in which a portion 71, opposite portion 70, of sleeve 68 is positioned adjacent to wall 26, and a second operating position (shown by the dotted line in FIG. 3) in which portion 70 of sleeve 68 is positioned adjacent to wall 24.

Sleeve 68 is fitted with two cylindrical gears 78 and 80 of substantially the same width, and the first of which presents a larger diameter than the second.

Gear 48 is therefore replaced by a gear 82, the width of which is approximately equal to but no less than the distance between a first face of gear 78 facing wall 26 when sleeve 68 is in the first operating position, and a second face opposite to the first face of the same gear 78 when sleeve 68 is in the second operating position. Member 32 is fitted with a number of cylindrical gears, which, in the example shown, comprise two gears 84 and 86, the first smaller in diameter than the second, and which mesh respectively with gears 78 and 80, depending on whether sleeve 68 is in the first or second operating position.

Transmission assembly 64 therefore provides, for a constant angular speed of shafts 49 and 66, for achieving different angular speeds of the tool, and more specifically, a first high speed when sleeve 68 is set to the first position in which gears 84 and 78 mesh, and a second lower speed when sleeve 68 is set to the second position in which gears 86 and 80 mesh.

I claim:

1. A machine (1) for cutting a pack of solid parts (2) comprising:

a frame (4) extending in a given direction (8);

a carriage (14) movable in relation to said frame (4) and in said direction (8);

pressing means (60) for pressing said parts (2) downwardly to a worktable integral with said frame (4) to form the pack;

actuating means (18) on said carriage being provided to move said carriage (14), in said direction (8), to and from an idle position;

said actuating means (18) including a first motor (22) on said carriage for moving said carriage;

said carriage (14) supporting at least one rotary member (32) below said worktable for integrally supporting at least one tool (36)(58) for cutting the parts (2) parallel to said direction (8); and the carriage (14) also supporting below said worktable at least one drive device (38) comprising a second motor (40) and a beltless transmission assembly (46)(64) for activating a respective one of said at least one rotary member (32);

said second motor (40) of said drive device (38) being separate and independent from said first motor (22) of said actuating means (18);

said transmission assembly (46)(64) comprising a gear transmission assembly (46)(64) interposed between said second motor (40) and said rotary member (32), wherein said second motor comprises a drive shaft; said gear transmission assembly comprising a first gear on said drive shaft, and a countershaft located between said second motor and said rotary member, wherein said drive shaft, said countershaft and said rotary member have axes which are parallel to each other, and wherein said frame comprises a rack (16) extending in said direction (8), said actuating means comprises a pinion (20) driven by said first motor (22) and engaging said rack (16) to move said carriage in said direction (8), said frame (4) comprises a straight guide (10) including two cylindrical bodies (12) each extending in said direction (8), and said carriage (14) comprises a pair of axial sliding configurations for respectively engaging said two cylindrical bodies for moving said carriage (14) along said guide (10) and for moving said carriage (14) along said two cylindrical bodies (12), and wherein said rack (16) is located between said two cylindrical bodies (12) and parallel thereto.

2. A machine as claimed in claim 1, characterized in that said transmission assembly (46)(64) activates said rotary member (32) at a rotation speed other than that of said second motor (40) according to at least one given reduction ratio.

3. A machine as claimed in claim 1, characterized in that said carriage (14) supports two tools (36, 58).

4. A machine as claimed in claim 3 characterized in that each of said two tools (36, 58) presents a respective axis of rotation (36a, 58a); said two axes of rotation (36a, 58a) defining a plane parallel to said given direction (8).

5. A machine as claimed in claim 1, characterized in that said direction (8) is substantially horizontal, and said axes (36a, 58a) are substantially perpendicular to said direction (8).

6. A machine as claimed in claim 1, comprising a plurality of tools and characterized in that said tools (36, 58) are circular saws; said axes (36a, 58a) being substantially horizontal.

7. A machine as claimed in claim 1, characterized in that said transmission assembly (46)(64) comprises at least one second gear angularly fixed in relation to said countershaft and meshing with said first gear.

8. A machine as claimed in claim 7, characterized in that said rotary member (32) has at least one third gear meshing with a respective one of said at least one second gear.

9. A machine as claimed in claim 1, characterized in that the transmission assembly (64) is a gearbox for varying the rotation speed of the rotary member (32).

10. A machine as claimed in claim 1, characterized in that said rotary member (32) has a plurality of third gears and said countershaft supports a plurality of second gears in angularly-fixed, axially-sliding manner for meshing with said first gear; each of said plurality of third gears meshing selectively with a respective one of said plurality of second gears.

11. A machine as claimed in claim 1 wherein the machine is configured for cutting wooden parts.

12. A machine as claimed in claim 1 wherein the machine is configured for cutting wooden panels.

13. A machine as claimed in claim 1, wherein said parallel axes of said drive shaft, said countershaft and said rotary member are in a same vertical plane.

* * * * *